(12) United States Patent
Khayrallah et al.

(10) Patent No.: US 8,391,201 B2
(45) Date of Patent: Mar. 5, 2013

(54) SYSTEM AND METHOD FOR TRANSMIT TIME COMPUTATION AT A RELAY STATION

(75) Inventors: Ali S. Khayrallah, Cary, NC (US); Havish Koorapaty, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1200 days.

(21) Appl. No.: 11/957,522

(22) Filed: Dec. 17, 2007

(65) Prior Publication Data

US 2009/0154533 A1 Jun. 18, 2009

(51) Int. Cl.
*H04B 7/14* (2006.01)
(52) U.S. Cl. .......................................... 370/315; 455/18
(58) Field of Classification Search .................... 370/315
See application file for complete search history.

(56) References Cited

U.S. PATENT DOCUMENTS

| 7,184,703 | B1 * | 2/2007 | Naden et al. | 455/10 |
| 2004/0266339 | A1 * | 12/2004 | Larsson | 455/7 |
| 2008/0062909 | A1 * | 3/2008 | Shin et al. | 370/315 |
| 2008/0095038 | A1 * | 4/2008 | Chang et al. | 370/208 |
| 2008/0151809 | A1 * | 6/2008 | Chindapol et al. | 370/315 |
| 2008/0240018 | A1 * | 10/2008 | Xue et al. | 370/328 |
| 2008/0304555 | A1 * | 12/2008 | Larsson | 375/211 |

FOREIGN PATENT DOCUMENTS

| JP | 1 990 930 A1 | 11/2008 |
| WO | 2006/121381 A1 | 11/2006 |
| WO | 2007/064252 A1 | 6/2007 |
| WO | 2007/108409 A1 | 9/2007 |

OTHER PUBLICATIONS

International Search Report & Written Opinion dated Nov. 17, 2008 (13 pages).
S. Ben Slimane et al., "Relay Communication with Delay Diversity for Future Communication Systems", Vehicular Technology Conference, Sep. 2006, IEEE 64th, The Royal Institute of Technology, pp. 1-5.
Aria Nosratinia et al., "Cooperative Communication in Wireless Networks", Communications Magazine, Oct. 2004, IEEE, vol. 42, No. 10, pp. 74-80.
Japanese Office Action w/ partial English translation dated Feb. 21, 2012 (8 pages total).
Chinese Office Action dated Aug. 31, 2012 (7 pages).

* cited by examiner

*Primary Examiner* — Sulaiman Nooristany
(74) *Attorney, Agent, or Firm* — Nixon & Vanderhye P.C.

(57) ABSTRACT

Communications between a base station and a mobile station is improved through using a relay station. A transmit timing of relayed signals from the relay station is controlled so that the signals from the base station and the relay station arrive to the mobile station aligned with each other within a predetermined tolerance.

30 Claims, 8 Drawing Sheets

SYSTEM AND METHOD FOR TRANSMIT TIME COMPUTATION AT A RELAY STATION

TECHNICAL FIELD

An aspect of this disclosure relates to systems and methods for timing communication signal transmissions from a base station and from a relay station so that the respective signals arrive at a mobile station substantially simultaneously.

BACKGROUND

Techniques to improve communications between a base station and a mobile station using a relay station have been studied. A relay station may be used to improve coverage and throughput in the system. The relay station can assist a base station in communicating with a mobile station that may be experiencing very poor signal conditions, leading to coverage improvements in the network. Throughput improvements may be achieved with the relay station in general by increasing the capacity of the link to the mobile station.

One particular technique to improve communications using the relay station is referred to as "cooperative relaying", which involves simultaneous reception of signals transmitted from the base station and the relay station at the mobile station. As an example, cyclic delay diversity may be used in an orthogonal frequency division multiplexing (OFDM) system where the signal from the relay station is a cyclically delayed version of the signal from the base station. Such techniques generally depend on the signals from the relay station and the base station arriving at the mobile station at approximately at the same time with any time misalignment being small enough to be accommodated by the receiver of the mobile station.

In general, it is assumed that the transmissions from the relay station coincide with the transmissions from the base station at the mobile station, and that any disparities in arrival times due to the propagation distance differences are small enough so as to not create any particular problems. For example, in an OFDM system, it is generally assumed that the arrival time difference between the base station and relay station signals at the mobile station is smaller than the cyclic prefix portion of the transmissions.

One way to achieve this goal of having the signals arrive at the same time is to set the signal transmit time at the relay station to the time the relay station would receive the signal from the base station. In this instance, the misalignment becomes smaller as the distance between the relay station and the mobile station decreases, with a perfect alignment being achieved when the relay and the mobile stations are co-located.

A second solution is for the mobile station to go through a ranging process involving signaling and communication with the relay station so that the relay station can compute the correct transmit time for the mobile station. The relay station sends a signal to the mobile station so that the mobile station can measure the time of arrival of the signal and compare it with the time of arrival of a transmission from the base station. The mobile station then can signal the correction in transmit time required back to the relay station.

With the first solution, the assumption that the difference in arrival times is small enough so that the performance is not affected is not necessarily true in all situations. Consider the scenario shown in FIG. 1, which illustrates an example wireless network 100 which includes a base station 110 and a relay station 120 providing communication services to mobile stations 130-1 and 130-2. Also illustrated are communication links among the base station 110, the relay station 120 and the mobile stations 130. The value $D_{BS}$ on the link between the base station 110 and the relay station 120 represents a propagation delay of a signal originating from the base station 110 to the relay station 120. The subscripted text for each delay value refers to the link and the direction for which the delay is represented by the variable. The propagation delay of the links are assumed to include any non-line-of-sight effects. Also, since propagation delay is primarily a function of the environment, the direction of the link does not affect the propagation delay. For example, the propagation delay between the base station 110 and the first mobile station 130-1 is the same whether the signal is transmitted from the base station 110 to the mobile station 130 or vice-versa (i.e., $D_{BM}=D_{MB}$).

Typically, the relay station 120 transmits the signal for both mobile stations 130 at the same time. It is extremely unlikely that both mobile stations 130 will be at a same distance from the relay station 120. Thus, the propagation delays between the relay station 120 and the respective mobile stations 130-1 and 130-2 will not be equal, i.e., $D_{RM1} \neq D_{RM2}$. Thus, if the relay station 120 uses the same transmit time for both mobile stations 130, the transmission from the base station 110 and the relay station 120 will not be aligned for at least one of the mobile stations 130. This problem is compounded as the number of the mobile stations 130 increase.

For large cells, the distances between the relay station 120 and the mobile stations 130 can be in the order of 600 meters or more. This corresponds to a propagation delay of 2 microseconds. Depending on the location of the mobile station 130 in relation to the base station 110 and the relay station 120, a timing misalignment of up to ±2 microseconds can result. For a Long Term Evolution (LTE) system with a cyclic prefix period of 4.69 microseconds, this would leave significantly less room for the delay spread of the relay station-mobile station channel. If the channel has a path delay of 3 microseconds, the path will fall outside the cyclic prefix period when the mobile station 130 receives the combined signals from the relay station 120 and the base station 110. Thus, the first solution is unsatisfactory.

A shortcoming of the second solution of using the ranging process between the mobile station 130 and the relay station 120 is that the solution precludes simple system solutions where the relay station 120 has minimal impact on the frame structure and signaling in the system. Since the mobile station needs to implement new functionality and new signaling messages, it is not possible to incorporate relay stations in a legacy system in a way that works with older mobile stations. This limits the advantages of using relay stations in some cases. Even for systems, where such compatibility requirements with legacy mobile stations don't exist, such control procedures can consume valuable system resources. In other words, this solution can severely increase the complexity of the system.

SUMMARY

In an embodiment, a method of communicating with a mobile station 130 is disclosed. In the method, a communication signal $S_C$ from a base station 110 of a network is received at a relay station 120 of the network. The signal $S_C$ is to be relayed as a relayed signal $S_R$ to the mobile station 130 from the relay station 120. The method includes determining a relay transmission time $t_{RM}$ and transmitting the signal $S_R$ to the mobile station 130 at time $t_{RM}$ from the relay station 120. The signal $S_C$ from the base station 110 is also transmitted to the mobile station 130. The relay transmission time $t_{RM}$ is determined so that the signals $S_R$ from the relay station 120 and the signal $S_C$ from the base station 110 arrive within a predetermined time period of each other at the mobile station 130. The predetermined time period can be set to ensure that the mobile station can realize the data rate gains achievable, for example, by using cooperative relaying techniques.

In an aspect, the signals $S_C$ and $S_R$ are each transmitted in one or more signal frames, and the time $t_{RM}$ is determined such that the frame boundaries of the signals $S_C$ and $S_R$ are aligned within the predetermined time period of each other at the mobile station 130. Each signal frame includes a guard period and a transmission period. Transmissions occur during the transmission period. While a duration of the predetermined time period can be substantially equal to the duration of the guard period, it is preferred that the predetermined time period be less than the duration of the guard period. It is preferred that the time $t_{RM}$ be set such that the guard period of the signal $S_C$ overlaps at least a portion of the guard period of the signal $S_R$ at the mobile station 130. Preferably, the frame boundaries of the signals $S_C$ and $S_R$ are perfectly aligned, and in particular, the guard periods of the signals completely overlap.

Further, the relayed signal $S_R$ from the relay station 120 may be a frame delayed version of the communication signal $S_C$ from the base station 110 such that $S_R(n)=S_C(n-k)$. Here, $S_R(n)$ represents a value of the relayed signal $S_R$ at timeframe n, $S_C(n-k)$ represents a value of the signal $S_C$ at time frame k number of frames prior to n and k is an integer $\geq 1$.

In another aspect, both signals $S_C$ and $S_R$ are transmitted as OFDM signals, and the relay transmission time $t_{RM}$ is determined such that the time domain burst boundaries of the signals $S_C$ and $S_R$ are lined within the predetermined time period of each other at the mobile station 130. The duration of the predetermined time period is preferably less than the duration of the cyclic prefix period of the signals, but can be substantially equal. It is preferred that the time $t_{RM}$ be set such that the cyclic prefix period of the signal $S_C$ overlaps at least a portion of the cyclic prefix period of the signal $S_R$ at the mobile station 130. It is particularly preferred that the time domain burst boundaries of the signals be perfectly aligned and the cyclic prefix periods of the signals completely overlap.

The relayed OFDM symbol $S_R$ can be a cyclically delayed version of the communication signal OFDM symbol $S_C$ such that $S_R(n)=S_C(n-k)$. Here, $S_R(n)$ represents a value of the symbol $S_R$ at time n, $S_C(n-k)$ represents a value of the symbol $S_C$ at time n offset by a k number of samples determined in a cyclical manner and where k is an integer.

An example act of determining the relay transmission time $t_{RM}$ is disclosed. The act includes determining quantities $r_{BR}$, $D_{BR}$, $r_{MR}$, $K_1$, $K_2$ and $K_3$. The quantity $r_{BR}$ represents a reception time of the signal $S_C$ at the relay station 120, the quantity $D_{BR}$ represents a signal propagation delay between the base station 110 and the relay station 120, the quantity $r_{MR}$ represents a reception time of a signal $S_M$ from the mobile station 130 at the relay station 120, and $K_1$, $K_2$ and $K_3$ are constants related to timings of transmissions from the relay station 120, the base station 110 and the mobile station 130, respectively. These constants can be imposed by the frame structure of the communication system. The act includes calculating the relay transmission time $t_{RM}$ based on the determined quantities. The quantities $r_{BR}$, $r_{MR}$, and $D_{BR}$ are directly measured or determined by the relay station 120. An example calculation of the relay transmission time $t_{RM}$ is expressed as $t_{RM} \approx 2(r_{BR} - D_{BR} - K_2) + K_1 + K_3 - r_{MR}$. In an embodiment, the network is setup and operated such that any one or more of the quantities $K_1$, $K_2$ and $K_3$ are substantially equal to 0, i.e., can be neglected.

An example method of communicating with a plurality of mobile stations is disclosed. In this method, a communication signal $S_C$ from a base station 110 of a network is received at a relay station 120 of the network. For each mobile station 130, a corresponding relay transmission time $t_{RM}$ is determined. The act of determining the individual relay transmission time can be based on the example method as previously described. Based on the plurality of individual relay transmission times, a best fit relay transmission time $t_{RM-BEST}$ is determined, and the relayed signal $S_R$ is transmitted to the plurality of mobile stations at the time $t_{RM-BEST}$. The time $t_{RM-BEST}$ is determined so that the number of mobile stations receiving the signal $S_R$ and the signal $S_C$ within a predetermined time period of each other is optimized. Again, the predetermined time period can be set to ensure that the mobile stations can realize the data rate gains achievable, for example, by using cooperative relaying techniques.

In one aspect, the time $t_{RM-BEST}$ is set to a midpoint of a time window that overlaps a range of individual relay transmission times of the mobile stations such that a number of the relay transmission times falling within the time window is maximized. The duration of the time window can be equivalent to the predetermined time period. Other simple ways to determine the best fit relay transmission time is to take a mean, a median, or a mode of the individual relay transmission times of the mobile stations.

An example embodiment of a relay station 120 of a wireless network configured to communicate with a mobile station 130 is disclosed. The mobile station 130 includes a base station 110 communication unit, a communication control unit and a mobile station 130 communication unit. The relay station 120 communication unit is configured to receive a communication signal $S_C$ from the base station 110 to be relayed as a relayed signal $S_R$. The communication control unit is configured to determine a relay transmission time $t_{RM}$, and the relay station 120 communication unit is configured to transmit the signal $S_R$ to the mobile station 130 at the relay transmission time $t_{RM}$. The time $t_{RM}$ is determined such that the relayed signal $S_R$ and the communication signal $S_C$ arrive within a predetermined time period of each other at the mobile station 130. The predetermined time period is set to ensure that that the mobile station can realize the data rate gains achievable using cooperative relaying techniques. The signal $S_C$ from the base station 110 is also transmitted to the mobile station 130. In an embodiment, the components of the relay station 120 are configured to perform the methods described above.

In another embodiment, a wireless network 100, which can include a base station 110 and a relay station 120, is configured to provide communication services to one or more mobile stations. The relay station 120 can be configured to implement the methods as described above.

BRIEF DESCRIPTION OF THE DRAWINGS

The foregoing and other objects, features and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various elements including functional blocks labeled or described as "communication unit" or "control unit" may be provided through the use of dedicated hardware as well as hardware capable of executing software in association with appropriate software. The capabilities may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
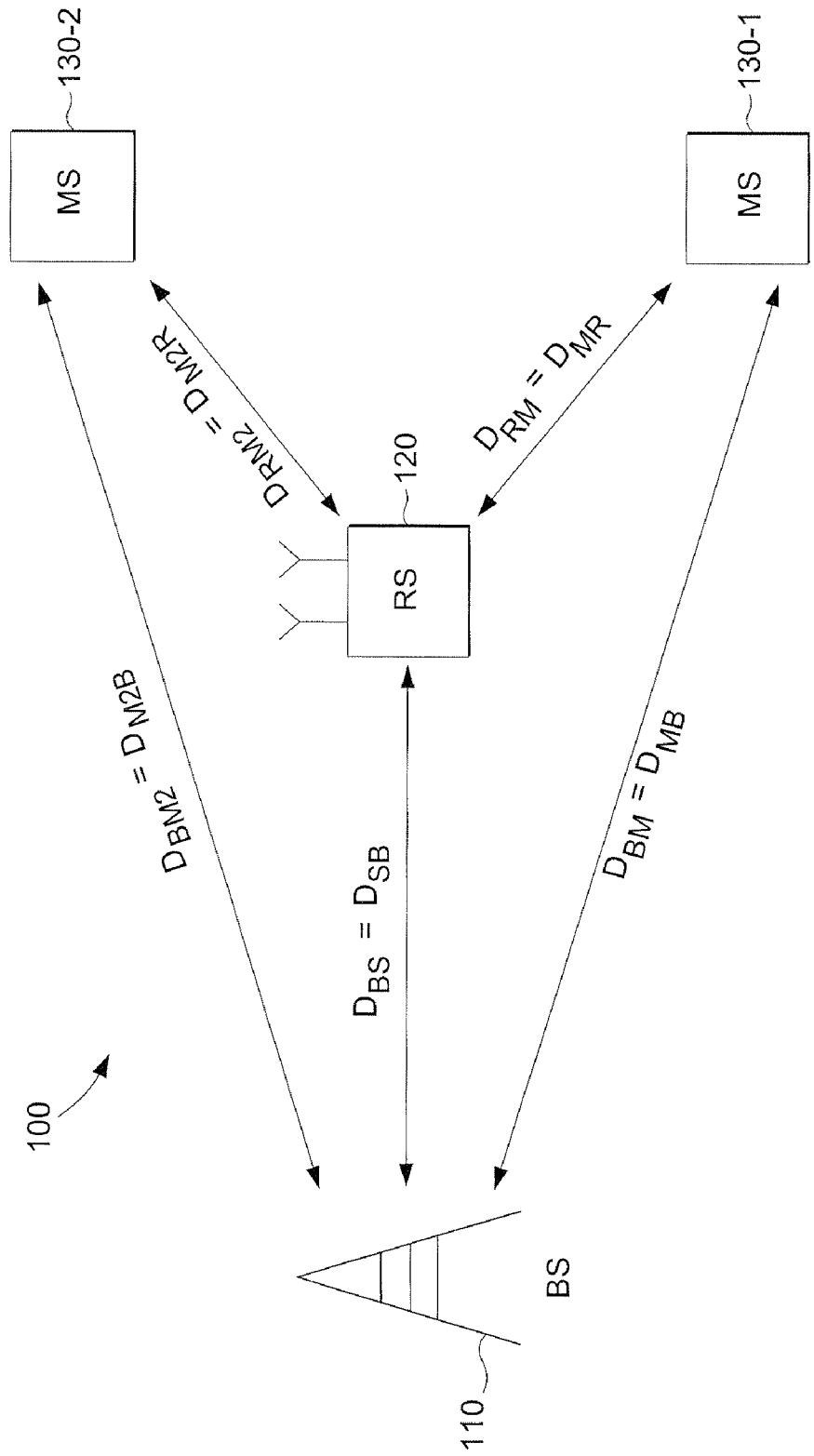
FIG. 1 illustrates an example network configured to provide communication services to one or more mobile stations.

The present technology is described in the non-limiting, example context of a communication network of FIG. 1. In the cooperative relaying technique, a mobile station 130 receives signals transmitted from both the base station 110 and the relay station 120. In FIG. 1, each of the mobile stations 130-1 and 130-2 receive signals from the base station 110 and the relay station 120. For simplicity of explanation, communication service provided to the first mobile station 130-1 (simply referred to as mobile station 130) will be described. The description will be equally applicable to the second mobile station 130-2.

The mobile station 130 receives a communication signal $S_C$ from the base station 110 and a relayed signal $S_R$ from the relay station 120. For the maximization of the throughput and coverage gains achievable using the relay station 120, the signals $S_C$ and $S_R$ should arrive at the mobile station 130 within a predetermined period of each other. The predetermined period, which may represent an amount of tolerance for misalignment, may be set based on the signal design used by the system and/or constraints on mobile station complexity that should be adhered to by the network 100. The most preferable situation is when the signals $S_C$ and $S_R$ are perfectly aligned at the mobile station 130.

Mathematically, assume that the quantity $r_{BM}$ represents a time of reception at the mobile station 130 of the communication signal $S_C$ transmitted from the base station 110. Similarly, assume $r_{RM}$ represents a time of reception at the mobile station 130 of the relayed signal $S_R$ transmitted from the relay station 120. Then the desired outcome may be expressed as equation (0) as follows.

$$r_{BM} \approx r_{RM} \qquad (0)$$

Equation (0) simply expresses that the reception times of the signals $S_C$ and $S_R$ at the mobile station 130 should be within the predetermined time period of each other, with the best situation occurring when the reception times are perfectly aligned, i.e., equal to each other. In an example embodiment, a relay transmission time $t_{RM}$, which represents a time of transmission at the relay station 120 of the relay signal $S_C$, is set such that equation (0) is satisfied.

Figure 2:
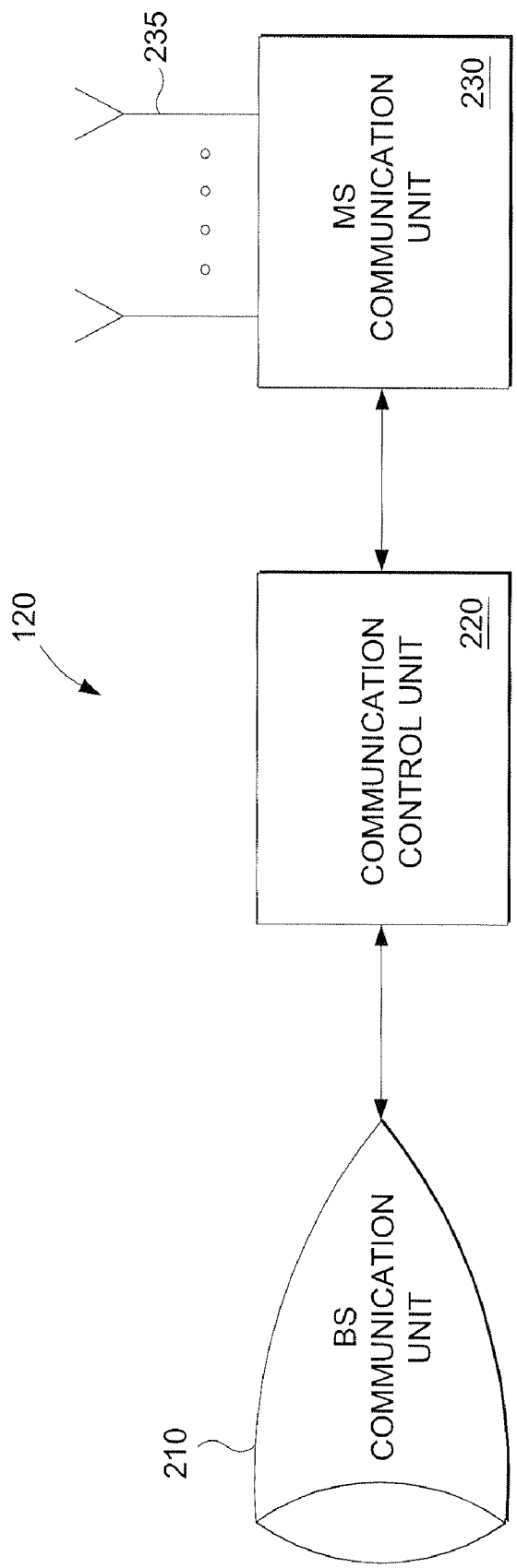
FIG. 2 illustrates an example embodiment of a relay station.

FIG. 2 illustrates an example relay station 120 configured to communicate with a mobile station 130. The relay station 120 includes a base station communication unit 210 configured to receive the communication signal $S_C$ from the base station 110 (and which is to be relayed as the relayed signal $S_R$ to the mobile station 130). The relay station 120 also includes a communication control unit 220 (operatively connected to the base station communication unit 210 and configured to determine the relay transmission time $t_{RM}$) and includes a mobile station communication unit 230 (operatively connected to the communication control unit 220 and configured to receive signals from the mobile station 130 and transmit, at the time $t_{RM}$, the relayed signal $S_R$ to the mobile station 130). In an example embodiment, the components of the relay station 120 are configured to perform one or more methods so that equation (0) is satisfied.

Figure 3:
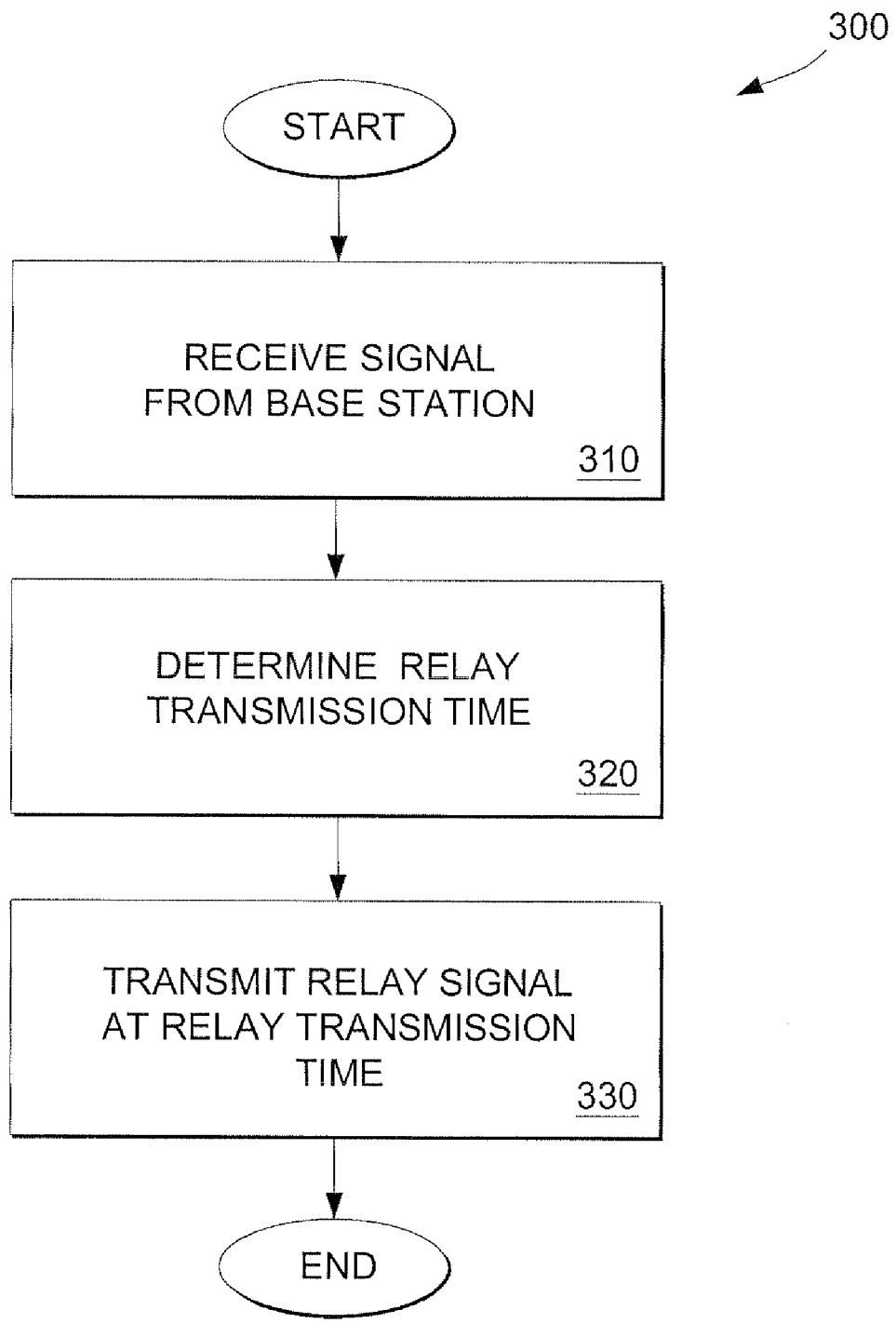
FIG. 3 illustrates a flowchart of an example method of communicating with a mobile station.

One such example method 300 is illustrated as a flowchart in FIG. 3. The method 300 includes receiving, at a relay station 120 of a wireless network 100, a communication signal $S_C$ from a base station 110 of the network 100 to be relayed as a relayed signal $S_R$ to a mobile station 130 from the relay station 120 (act 310). The method 300 also includes determining a relay transmission time $t_{RM}$ (act 320), and transmitting, from the relay station 120 at the time $t_{RM}$, the signal $S_R$ to the mobile station 130 (act 330). The relay transmission time $t_{RM}$ is determined so that the relayed signal $S_R$ and the communication signal $S_C$ arrive within a predetermined time period of each other at the mobile station 130. Most preferably, the signals $S_R$ and $S_C$ are perfectly aligned with each other at the mobile station 130. The predetermined time period can be set to ensure that the throughput and coverage gains achievable using the relay station 120 are maximized.

Figure 4A:
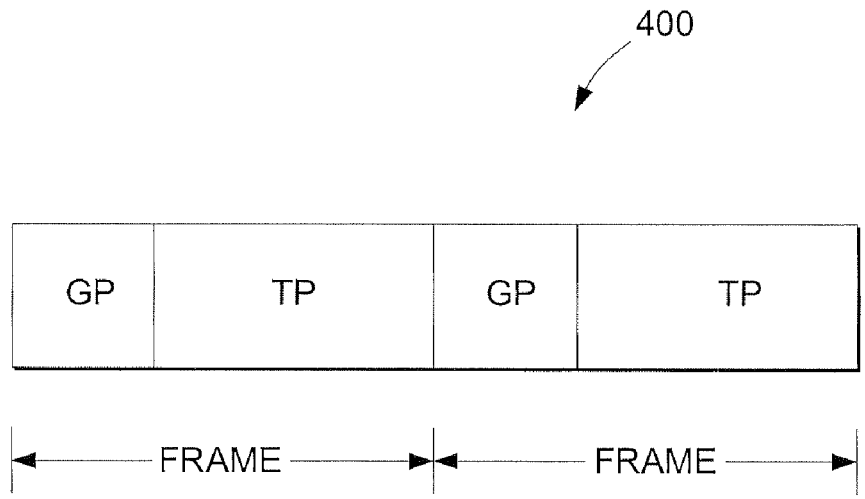
FIG. 4A is an example illustration of a signal frame which includes guard and transmission periods.

Both signals $S_C$ and $S_R$ may each be transmitted in one or more signal frames. FIG. 4A illustrates a structure of an example signal frame 400. Each frame 400 includes a guard period (GP) and a transmission period (TP). In FIG. 4A, two successive signal frames are shown. Transmissions typically occur during TP. Each GP separates successive TPs. Such guard periods are common in time-division duplex systems where base stations and mobile stations transmit on the same frequency channel but are separated in time. The guard period is provided in order to account for varying propagation distances between mobile stations and the base station and to allow the base station some time to switch between the transmitter and the receiver. The guard period allows the mobile station that is furthest from the base station to receive the signal from the base station without experiencing any interference from nearby mobile stations transmitting on the uplink.

Figure 4B:
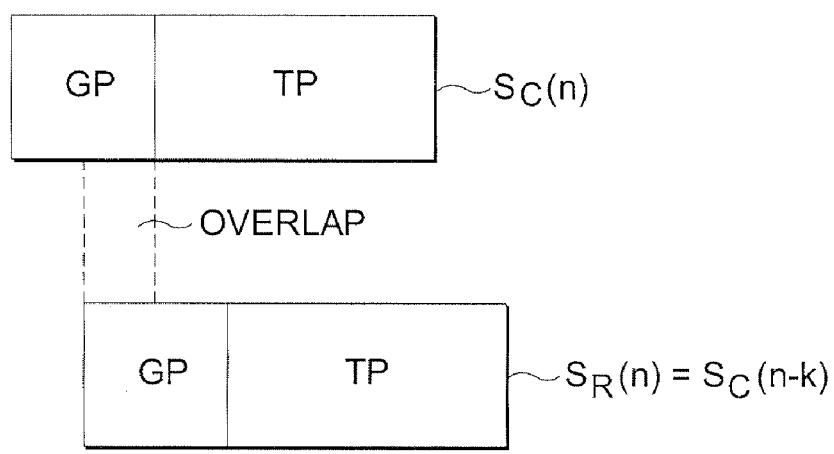
FIG. 4B illustrates an example boundary alignments of the signal frames showing an overlap of the guard periods.

In one aspect, the act 320 of determining the time $t_{RM}$ is performed such that the frame boundaries of the signals $S_C$ and $S_R$ are aligned within a predetermined time period of each other at the mobile station 130. An example of such alignment of signals is illustrated in FIG. 4B, where it is assumed that a duration of the predetermined time period is substantially equal to or less than (preferred) the duration of the guard period GP. Then for the equation (0) to be satisfied, there should be some overlap of the guard periods of the signals $S_C$ and $S_R$ at the mobile station 130.

It is mentioned above that the relayed signal $S_R$ can be a delayed version of the communication signal $S_C$ transmitted from the base station 110. When the signals $S_C$ and $S_R$ are transmitted in one or more frames, the relayed signal $S_R$ can be a frame delayed version of the communication signal $S_C$ as expressed in equation (1).

$$S_R(n) = S_C(n-k) \tag{1}$$

In equation (1), $S_R(n)$ represents a value of the relayed signal $S_R$ at timeframe n, $S_C(n-k)$ represents a value of the communication signal $S_C$ at time frame k number of frames prior to n and k is an integer $\geq 1$.

Figure 5A:
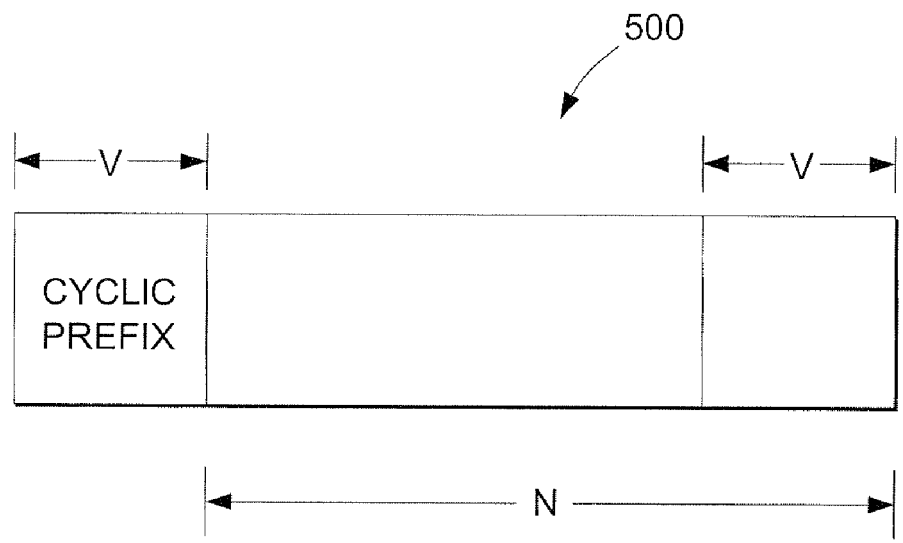
FIG. 5A illustrates a structure of an OFDM transmission burst including the cyclic prefix period.
Figure 5B:
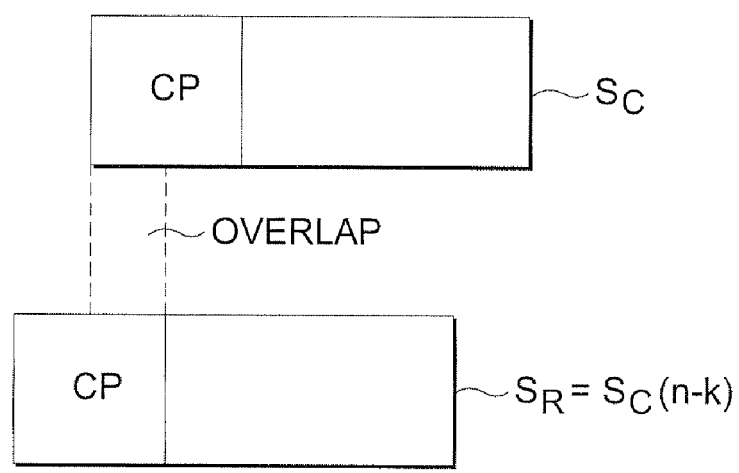
FIG. 5B illustrates an alignment of boundaries of two OFDM signals including an overlap of the cyclic prefix periods of the signals.

In another embodiment, the signals $S_C$ and $S_R$ may be implemented as OFDM symbols. FIG. 5A illustrates an example time domain burst 500 of an OFDM symbol. The OFDM time domain burst 500 includes a cyclic prefix period (CP). In an example situation where OFDM symbols are involved, the act 320 of determining the relay transmission time $t_{RM}$ includes determining the time $t_{RM}$ such that the time domain burst boundaries of the signals $S_C$ and $S_R$ are aligned within the predetermined time period of each other at the mobile station 130. The duration of the predetermined time period can be set to be some fraction of a duration of the cyclic prefix periods of the signals. One way to satisfy the equation (0) is to set the $t_{RM}$ such that the cyclic prefix period of the signal $S_C$ overlaps at least a portion of the cyclic prefix period of the signal $S_R$ at the mobile station 130 as illustrated in FIG. 5B. Perfect alignment occurs when the cyclic prefix periods completely overlap.

The relayed signal can be a cyclically delayed version of the communication signal as expressed in equation (2).

$$S_R(n) = S_C(n-k) \tag{2}$$

In equation (2), $S_R(n)$ represents a value of the OFDM symbol $S_R$ at time n, $S_C(n-k)$ represents a value of the OFDM symbol $S_C$ at time n offset by a k number of samples determined in a cyclic manner and where k is an integer. The values within the parentheses represent time domain burst samples rather than frames.

One specific algorithm among many to satisfy equation (0) is disclosed. The explanation of this algorithm begins with expressing a time of reception of a signal at a mobile station 130 transmitted from a base station 110 as equation (3).

$$r_{BM} = t_{BM} + D_{BM} \tag{3}$$

In equation (3), the quantity $r_{BM}$ is a time of reception of a signal from the base station 110 at the mobile station 130, $t_{BM}$ is a time of transmission at the base station 110 and $D_{BM}$ is a propagation delay between the base station 110 and the mobile station 130. Referring back to FIG. 1, $D_{BM} = D_{MB}$ since they both refer to the same communication link. However, $t_{BM}$ (a time of transmission at the base station 110 of a signal to the mobile station 130) does not equal $t_{MB}$ (a time of transmission of a signal at the mobile station 130 to the base station 110). Similarly, $r_{BM}$ does not equal $r_{MB}$ (a time of reception at the base station 110 of a signal transmitted from the mobile station 130). The transmit time on the uplink—$t_{MB}$—is dependent on the reception time of the downlink signal from the base station 110—$r_{BM}$—and a timing adjustment, commonly referred to as timing advance, provided by the base station 110. The purpose of the timing advance is to ensure that the base station 110 receives signals from all mobile stations 130 in a time aligned manner. The transmit time on the uplink for transmissions from the mobile station 130 to the base station 110 can be represented as equation (4).

$$t_{MB} = r_{BM} + K_1 - T_{MB} \tag{4}$$

In equation (4), the quantity $T_{MB}$ is the timing advance referred to above and the quantity $K_1$ is a constant that is related to the frame structure. For example, in a time-division duplex system, a frame may be split into a downlink and an uplink sub-frame with the uplink sub-frame starting at a time $K_1$ after the downlink sub-frame. The timing advance value is set by the base station 110 so that the received signals from multiple mobile stations 130 arrive at the base station 110 at the same time. This is achieved by setting the timing advance to be twice the propagation delay as expressed in equation (5).

$$T_{MB} = 2D_{MB} = 2D_{BM} \tag{5}$$

From equations (3), (4) and (5), the uplink transmission time $t_{MB}$ is derived and expressed in equation (6).

$$t_{MB} = t_{BM} + K_1 - D_{MB} \tag{6}$$

The relay station 120 is assumed to be able to receive signals from both the base station 110 and mobile stations 130 in an embodiment. That is, the relay station 120 can measure the times of reception of signals from both the mobile station 130 and from the base station 110. These measurements are expressed in equations 7 and 8.

$$r_{BR} = t_{BR} + D_{BR} = t_{BM} + K_2 + D_{BR} \tag{7}$$

$$r_{MR} = t_{MR} + D_{MR} = t_{MB} + K_3 + D_{MR} \tag{8}$$

Equation (7) expresses a time of reception $r_{BR}$ at the relay station 120 of signals transmitted from the base station 110, and equation (8) expresses a time of reception $r_{MR}$ at the relay station 120 of signals $S_M$ transmitted from the mobile station 130. The quantity $K_2$ is a constant that relates the times of transmission at the base station 110 of signals transmitted to the mobile station 130 and to the relay station 120, and the quantity $K_3$ is a similarly defined constant for transmissions from the mobile station 130. Similar to the example for $K_1$, the quantities $K_2$ and $K_3$ could arise from the duration between different sub-frames in a frame. $K_2$ could be the difference in time between the sub-frame where the base station transmits to the relay station and the sub-frame where the base station 110 transmits to the mobile station 130. $K_3$ could similarly be the difference in time between the sub-frame where the mobile station 130 transmits to the relay station and the sub-frame where the mobile station transmits to the base station 110. It should be noted that such sub-frame definitions are not necessary for relay operation and thus the quantities $K_1$, $K_2$ and $K_3$ may consequently be zero as well. Thus, the constant $K_2$ can be set to 0 if the signal transmitted to the mobile station 130 from the base station 110 is also used by the relay station 120 to determine the time of reception. The constant $K_3$ can also be similarly set to 0.

A time of reception $r_{RM}$ at the mobile station 130 of a signal transmitted by the relay station 120 is expressed in equation (9).

$$r_{RM} = t_{RM} + D_{RM} = t_{RM} + D_{MR} \quad (9)$$

A goal is to compute a relay transmission timing $t_{RM}$ at the relay station 120 that will result in the signals from the base station 110 and the relay station 120 being received at the same time at the mobile station 130. In other words, we desire to achieve equation (10).

$$r_{BM} = r_{RM} \quad (10)$$

Note that equation (10) is a special case of equation (0) where perfect alignment is achieved. From equations (3) and (10), equation (11) is derived.

$$t_{RM} = t_{BM} + (D_{BM} - D_{MR}) \quad (11)$$

Equation (11) expresses the relay transmission time $t_{RM}$ to be computed, but the time $t_{RM}$ is expressed in relation to some quantities not directly measurable by the relay station 120. It would be desirable to determine the time $t_{RM}$ based only on quantities that are directly measurable or known to the relay station 120. These include $r_{BR}$, $r_{MR}$ and $D_{BM}$. The quantities $r_{BR}$ and $r_{MR}$ can be directly measured by the relay station 120, and the quantity $D_{BM}$ can be derived from the timing advance value of the relay station 120 provided to it by the base station 110 using equation (5). The relay transmission time $t_{BM}$ in terms of these quantities are derived as follows.

First, equation (7) is re-expressed as equation (12).

$$t_{BM} = r_{BR} - K_2 - D_{BR} \quad (12)$$

From equations (6) and (8), equation (13) is derived.

$$(D_{BM} - D_{MR}) = t_{BM} + K_1 + K_3 - r_{MR} \quad (13)$$

From equations (11), (12) and (13), the expression to compute the relay transmission time $t_{RM}$ is derived in equation (14).

$$t_{RM} = 2(r_{BR} - D_{BR} - K_2) + K_1 + K_3 - r_{MR} \quad (14)$$

Equation (14) expresses the time $t_{RM}$ to achieve perfect alignment. Since a certain amount of misalignment is tolerable, equation (14) is rewritten as equation (15) so that equation (0) is satisfied. Note that some misalignment is also expected to occur due to errors in measuring the times of arrival.

$$t_{RM} \approx 2(r_{BR} - D_{BR} - K_2) + K_1 + K_3 - r_{MR} \quad (15)$$

Equation (15) may be further simplified if the network 100, such as the frame structure, can be arranged and operated so that the constants $K_1$, $K_2$, and $K_3$ can be set to 0 which results in equation (16).

$$t_{RM} \approx 2(r_{BR} - D_{BR}) - r_{MR} \quad (16)$$

Figure 6:
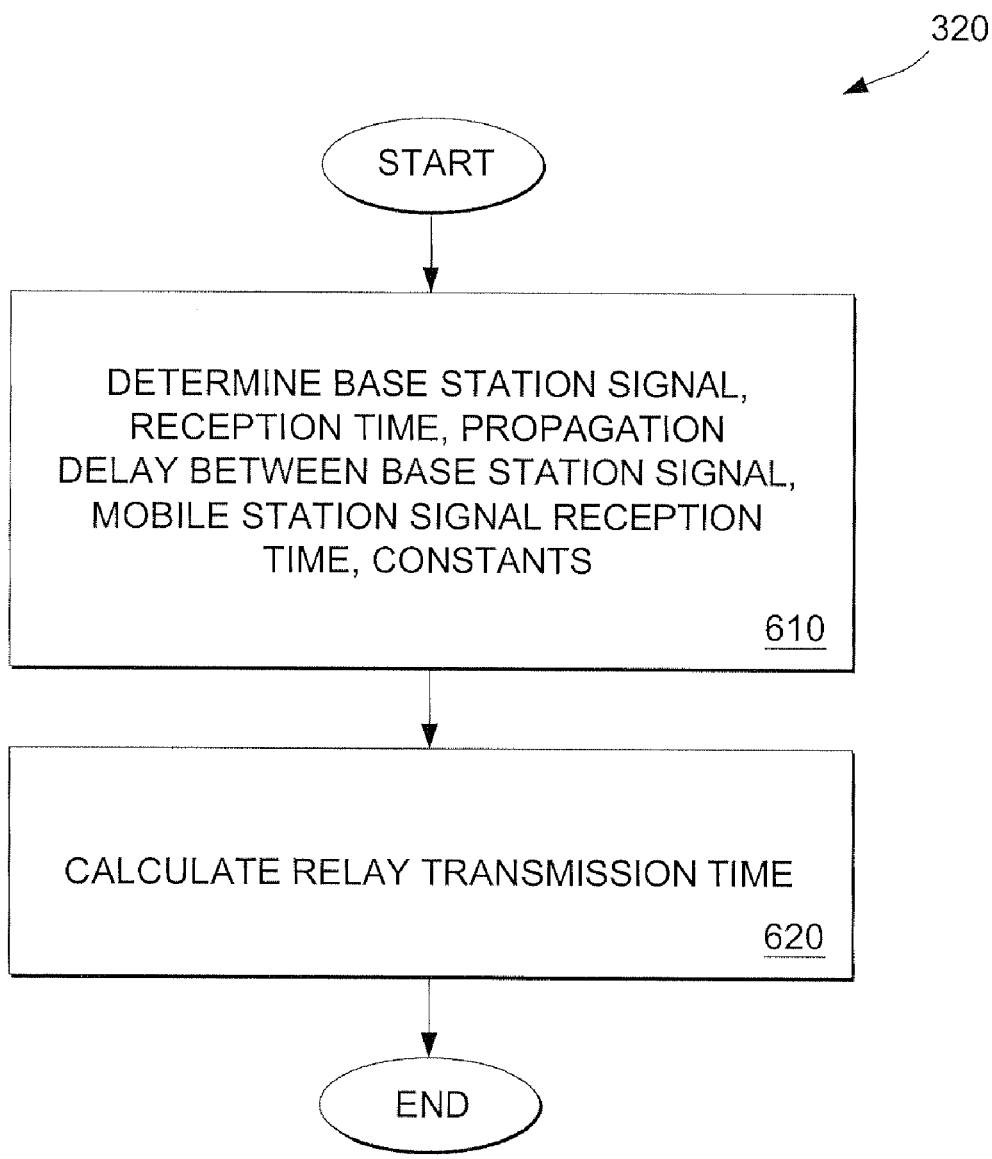
FIG. 6 illustrates a flowchart of an example method to determine a relay transmission time of a signal to be transmitted from the relay station 120.

FIG. 6 illustrates an example method to achieve the results expressed in equations 14, 15 and 16. In this method, the quantities $r_{BR}$, $D_{BR}$, and $r_{MR}$ and optionally $K_1$, $K_2$ and $K_3$ are determined (act 610) and the relay transmission time $t_{RM}$ is calculated based on these quantities (act 620). The quantities $r_{BR}$, $r_{MR}$ and $D_{BR}$ can be directly measured or determined by the relay station 120.

Figure 7:
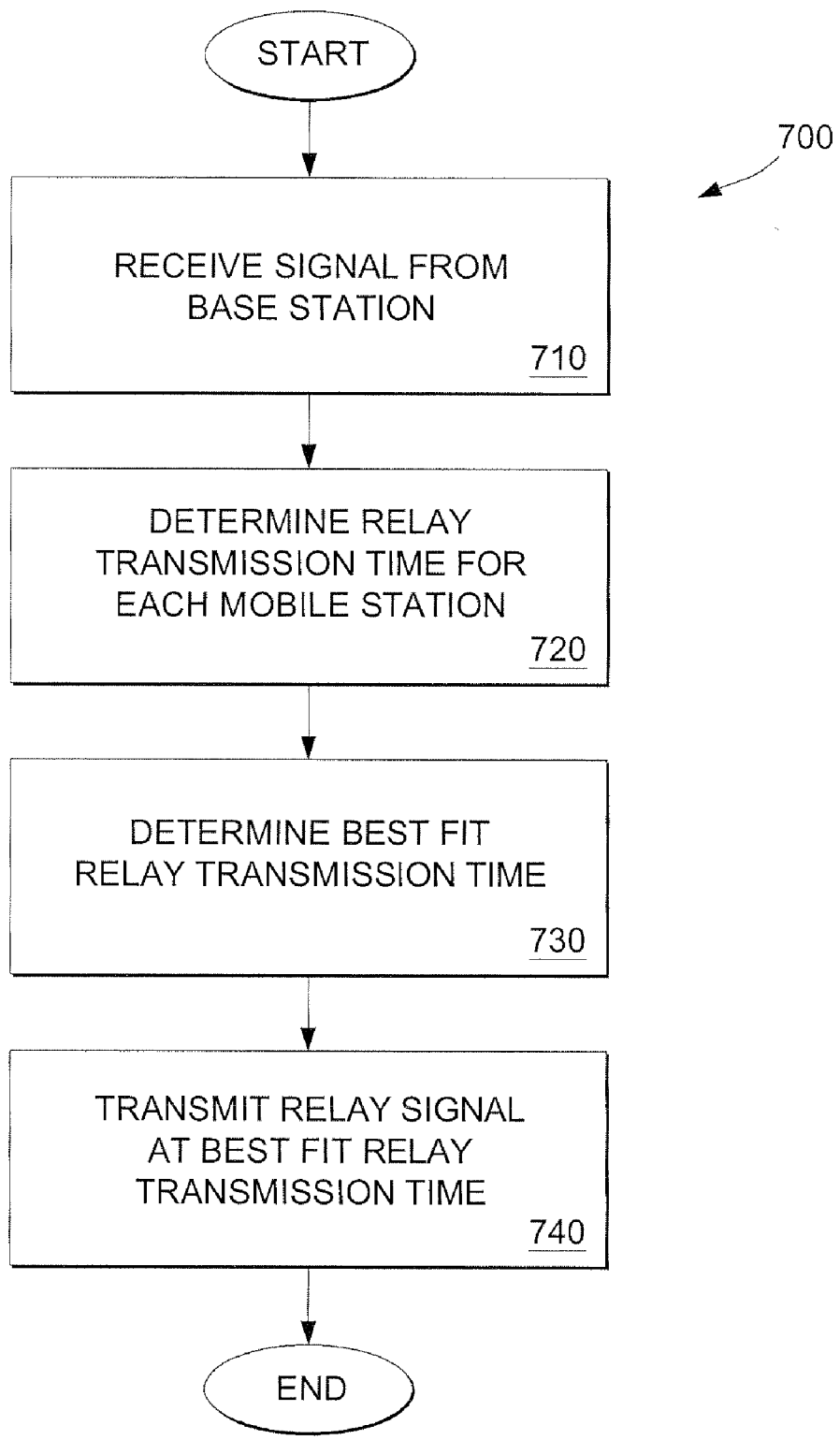
FIG. 7 illustrates a flowchart of an example method to provide communication services to a plurality of mobile stations.

FIG. 7 illustrates an example method 700 of communicating with a plurality of mobile stations 130. The method includes receiving, at a relay station 120 of a wireless network 100, a communication signal $S_C$ from a base station 110 to be relayed as a relayed signal $S_R$ to the plurality of mobile stations 130 (act 710), and the preferred individual relay transmission times $t_{RM}$ corresponding to each of the plurality of mobile stations 130 are determined (act 720), for example, by using equation (16). The individual times $t_{RM}$ may be determined according to the act 320 as illustrated in FIG. 3.

A single, best fit relay transmission time $t_{RM-BEST}$ for the relayed signal $S_R$ is determined based on the collective times $t_{RM}$ corresponding to the plurality of mobile stations 130 (act 730). The relayed signal $S_R$ is transmitted from the relay station 120 at the time $t_{RM-BEST}$ (act 740). The best fit transmission time $t_{RM-BEST}$ is determined to optimize a number of mobile stations 130 receiving the relayed signal $S_R$ and the communication signal $S_C$ within the predetermined time period of each other. Again, the predetermined time period may be set to ensure that the throughput and coverage gains achievable using the relay station 120 are maximized.

Figure 8:
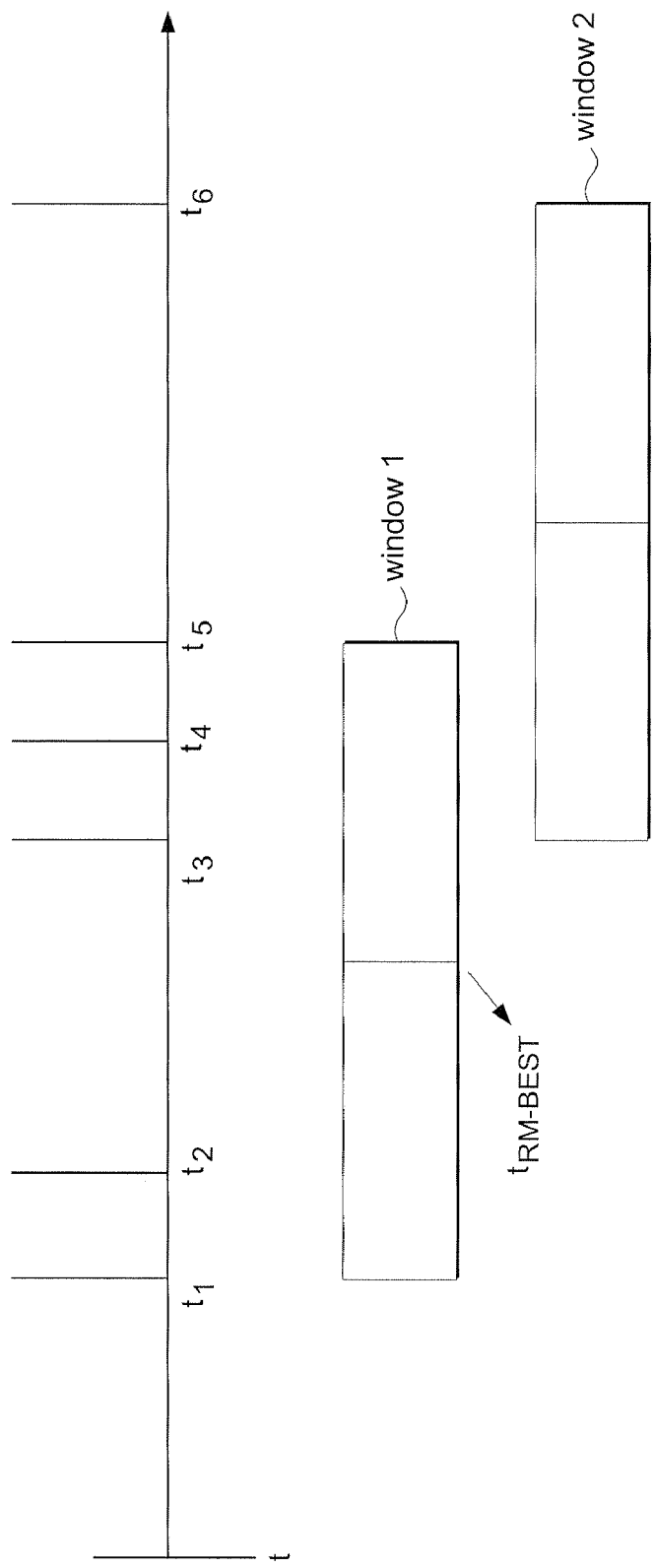
FIG. 8 illustrates a situation for determining a best fit relay transmission time.

In an aspect, the time $t_{RM-BEST}$ may be set to a midpoint of a time window as illustrated in FIG. 8. In FIG. 8, individual relay transmission times $t_1$ through $t_6$ of the plurality of mobile stations 130 are plotted along a timeline. Thus, the range of transmission times can be expressed as $t_6 - t_1$. A time window whose width is equivalent to the predetermined time period is placed to maximize the number of individual relay transmission times falling within the window. In FIG. 8, windows 1 and 2, both of equal duration are illustrated. Window 1 overlaps more of the individual relay transmission times than window 2. Thus, the best fit relay transmission time $t_{RM-BEST}$ is set to the midpoint of window 1.

There are other ways to set or select the best fit relay transmission times. These include setting the $t_{RM-BEST}$ to be a mean, a median or a mode of the individual relay transmission times of the plurality of mobile stations 130.

The components of the relay station 120 as illustrated in FIG. 2, may be configured to implement any of the methods described above.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method step in the present disclosure is intended to be dedicated to the public.

What is claimed is:

1. A method of communicating with a mobile station, comprising:
   receiving, at a relay station of a wireless network, a communication signal $S_C$ from a base station of the network to be relayed as a relayed signal $S_R$ to the mobile station from the relay station;
   determining, at the relay station, a relay transmission time $t_{RM}$ of the relayed signal $S_R$; and
   transmitting, from the relay station at the relay transmission time $t_{RM}$, the relayed signal $S_R$ to the mobile station,
   wherein the communication signal $S_C$ from the base station is also transmitted to the mobile station,
   wherein the relay transmission time $t_{RM}$ is determined so that the relayed signal $S_R$ and the communication signal $S_C$ arrive within a predetermined time period of each other at the mobile station,
   wherein the act of determining the relay transmission time $t_{RM}$ comprises:
   determining quantities $r_{BR}$, $D_{BR}$, $r_{MR}$; and
   calculating the relay transmission time $t_{RM}$ based on the quantities $r_{BR}$, $D_{BR}$, $r_{MR}$, and $r_{MR}$,
   wherein the quantity $r_{BR}$ represents a reception time of the communication signal $S_C$ from the base station at the relay station,
   wherein the quantity $D_{BR}$ represents a signal propagation delay between the base station and the relay station, and
   wherein the quantity $r_{MR}$ represents a reception time of a communication signal $S_M$ from the mobile station at the relay station.

2. The method of claim 1,
   wherein the communication signal $S_C$ and the relayed signal $S_R$ are both orthogonal frequency division multiplexed (OFDM) signals,
   wherein in the act of determining the relay transmission time $t_{RM}$ is performed such that time domain burst boundaries of the signals $S_C$ and $S_R$ are aligned within the predetermined time period of each other at the mobile station, and
   wherein a duration of the predetermined time period is substantially equal to or less than a duration of a cyclic prefix period of the signals $S_C$ and $S_R$.

3. The method of claim 2, wherein each OFDM symbol $S_R$ in the relayed signal is a cyclically delayed version of the corresponding OFDM symbol $S_C$ in the communication signal such that $S_R(n)=S_C(n-k)$,
   wherein $S_R(n)$ is a value of the symbol $S_R$ at time n,
   wherein $S_C(n-k)$ is a value of the symbol $S_C$ at time n offset by k number of samples determined in a cyclic manner, and
   wherein k is an integer.

4. The method of claim 1,
   wherein the communication signal $S_C$ and the relayed signal $S_R$ are each transmitted in one or more signal frames,
   wherein in the act of determining the relay transmission time $t_{RM}$ is performed such that frame boundaries of the signals $S_C$ and $S_R$ are aligned within the predetermined time period of each other at the mobile station,
   wherein each signal frame includes a guard period and a transmission period in which transmissions occur during the transmission period and no transmissions occur during the guard period, and
   wherein a duration of the predetermined time period is substantially equal to or less than a duration of the guard period.

5. The method of claim 4, wherein the relayed signal $S_R$ is a frame delayed version of the communication signal $S_C$ such that $S_R(n)=S_C(n-k)$,
   wherein $S_R(n)$ is a value of the relayed signal $S_R$ at time frame=n,
   wherein $S_C(n-k)$ is a value of the communication signal $S_C$ at time frame=k number of frames prior to n, and
   wherein k is an integer greater than or equal to 1.

6. The method of claim 1, wherein the quantities $r_{BR}$, $r_{MR}$, and $D_{BR}$ are directly measured or determined by the relay station.

7. The method of claim 1,
   wherein in the act of calculating the relay transmission time $t_{RM}$ comprises calculating the relay transmission time based on equation $t_{RM} \approx 2(r_{BR} - D_{BR} - K_2) + K_1 + K_3 - r_{MR}$, and wherein $K_1$, $K_2$ and $K_3$ are constants related to differences in timing of transmission from the relay station, the base station, and the mobile station, respectively as imposed by a frame structure of the communication system.

8. The method of claim 1, wherein the relay transmission time $t_{RM}$ is determined without the mobile station performing a ranging process.

9. The method of claim 1, wherein the relayed signal $S_R$ is not a converted form of the communication signal $S_C$.

10. A method of communicating with a plurality of mobile stations, comprising:
    receiving, at a relay station of a wireless network, a communication signal $S_C$ from a base station of the network to be relayed as a relayed signal $S_R$ to the plurality of mobile stations from the relay station;
    determining, at the relay station, an individual relay transmission time $t_{RM}$ corresponding to each of the plurality of mobile stations;
    determining, at the relay station, a best fit relay transmission time $t_{RM-BEST}$ based on the individual relay transmission times $t_{RM}$ corresponding to the plurality of mobile stations;
    transmitting, from the relay station at the best fit relay transmission time $t_{RM-BEST}$, the relayed signal $S_R$ to the plurality of mobile stations,
    wherein the communication signal $S_C$ from the base station is also transmitted to the plurality of mobile stations,
    wherein the best fit relay transmission time $t_{RM-BEST}$ is determined so that a number of mobile stations receiving the relayed signal $S_R$ and the communication signal $S_C$ within a predetermined time period of each other is optimized;
    wherein the act of determining the individual relay transmission time $t_{RM}$ corresponding to each of the plurality of mobile stations comprises performing for each mobile station:
    determining quantities $r_{BR}$, $D_{BR}$, $r_{MR}$; and calculating the relay transmission time $t_{RM}$ based on the quantities $r_{BR}$, $D_{BR}$ and $r_{MR}$,
    wherein the quantity $r_{BR}$ represents a reception time of the communication signal $S_C$ from the base station at the relay station,
    wherein the quantity $D_{BR}$ represents a signal propagation delay between the base station and the relay station, and
    wherein the quantity $r_{MR}$ represents a reception time of a communication signal $S_M$ from the mobile station at the relay station.

11. The method of claim 10,
wherein the best fit relay transmission time $t_{RM-BEST}$ is a midpoint of a time window that overlaps a range of relay transmission times $t_{RM}$ of the plurality of mobile stations such that a number of the relay transmission times $t_{RM}$ falling within the time window is maximized, and
wherein a duration of the time window is the predetermined time period.

12. The method of claim 10, wherein the best fit relay transmission time $t_{RM-BEST}$ is a mean, a median or a mode of the relay transmission times $t_{RM}$ of the plurality of mobile stations.

13. The method of claim 10,
wherein in the act of calculating the individual relay transmission time $t_{RM}$ for each mobile station comprises calculating the relay transmission time based on equation $t_{RM} \approx 2(r_{BR}-D_{BR}-K_2)+K_1+K_3-r_{MR}$, and
wherein $K_1$, $K_2$ and $K_3$ are constants related to differences in timing of transmission from the relay station, the base station, and the mobile station, respectively as imposed by a frame structure of the wireless network.

14. The method of claim 10, wherein the individual relay transmission times $t_{RM}$ are determined without any of the mobile stations performing a ranging process.

15. The method of claim 10, wherein the relayed signal $S_R$ is not a converted form of the communication signal $S_C$.

16. A relay station of a wireless network configured to communicate with a mobile station, comprising:
a base station communication unit configured to receive a communication signal $S_C$ from a base station of the network to be relayed as a relayed signal $S_R$ to the mobile station from the relay station;
a communication control unit operatively connected to the base station communication unit and configured to determine a relay transmission time $t_{RM}$ of the relayed signal $S_R$; and
a mobile station communication unit operatively connected to the communication control unit and configured to receive transmissions $S_M$ from the mobile station and transmit, at the relay transmission time $t_{RM}$, the relayed signal $S_R$ to the mobile station,
wherein the communication signal $S_C$ from the base station is also transmitted to the mobile station,
wherein the communication control unit is configured to determine the relay transmission time $t_{RM}$ so that the relayed signal $S_R$ and the communication signal $S_C$ arrive within a predetermined time period of each other at the mobile station,
wherein the communication control unit is configured to determine the relay transmission time $t_{RM}$ by:
determining quantities $r_{BR}$, $D_{BR}$, $r_{MR}$; and
calculating the relay transmission time $t_{RM}$ based on the quantities $r_{BR}$, $D_{BR}$ and $r_{MR}$,
wherein the quantity $r_{BR}$ represents a reception time of the communication signal $S_C$ from the base station at the relay station,
wherein the quantity $D_{BR}$ represents a signal propagation delay between the base station and the relay station, and
wherein the quantity $r_{MR}$ represents a reception time of a communication signal $S_M$ from the mobile station at the relay station.

17. The relay station of claim 16,
wherein the communication signal $S_C$ and the relayed signal $S_R$ are both orthogonal frequency division multiplexing (OFDM) signals,
wherein the communication control unit is configured to determine the relay transmission time $t_{RM}$ such that time domain burst boundaries of the signals $S_C$ and $S_R$ are aligned within the predetermined time period of each other at the mobile station, and
wherein a duration of the predetermined time period is less than a duration of a cyclic prefix period of the signals $S_C$ and $S_R$.

18. The relay station of claim 17, wherein each OFDM symbol $S_R$ of the relayed signal is a cyclically delayed version of the corresponding OFDM symbol $S_C$ of the communication signal such that $S_R(n)=S_C(n-k)$,
wherein $S_R(n)$ is a value of the symbol $S_R$ at time n,
wherein $S_C(n-k)$ is a value of the symbol $S_C$ at time n offset by k number of samples determined in a cyclic manner, and
wherein k is an integer.

19. The relay station of claim 16,
wherein the communication signal $S_C$ and the relayed signal $S_R$ are each transmitted in one or more signal frames,
wherein the communication control unit is configured to determine the relay transmission time $t_{RM}$ such that frame boundaries of the signals $S_C$ and the $S_R$ are aligned within the predetermined time period of each other at the mobile station,
wherein each signal frame includes a guard period and a transmission period in which transmissions occur during the transmission period and no transmission occur during the guard period, and
wherein a duration of the predetermined time period is less than a duration of the guard period.

20. The relay station of claim 19, wherein the relayed signal $S_R$ is a frame delayed version of the communication signal $S_C$ such that $S_R(n)=S_C(n-k)$,
wherein $S_R(n)$ is a value of the relayed signal $S_R$ at time frame=n,
wherein $S_C(n-k)$ is a value of the communication signal $S_C$ at time frame=k number of frames prior to t, and
wherein k is an integer greater than or equal to 1.

21. The relay station of claim 16, wherein the communication control unit is configured to directly determine the quantities $r_{BR}$, $r_{MR}$, and $D_{BR}$.

22. The relay station of claim 16,
wherein the communication control unit is configured to determine the relay transmission time according to $t_{RM} \approx 2(r_{BR}-D_{BR}-K_2)+K_1+K_3-r_{MR}$, and
wherein $K_1$, $K_2$ and $K_3$ are known constants related to differences in timing of transmission from the relay station, the base station, and the mobile station, respectively as imposed by a frame structure of the communication system.

23. The relay station of claim 16, wherein the communication control unit is configured to determine the relay transmission time $t_{RM}$ without the mobile station performing a ranging process.

24. The relay station of claim 16, wherein the relayed signal $S_R$ is not a converted form of the communication signal $S_C$.

25. A wireless network configured to communicate with a plurality of mobile stations, comprising:
a base station configured to transmit a communication signal ($S_C$) to the plurality of mobile terminals and to a relay station; and
the relay station configured to relay the communication signal $S_C$ as a relayed signal ($S_R$) to the plurality of mobile stations,
wherein the relay station comprises the base station communication unit, the communication control unit, and the mobile station communication unit, wherein the communication control unit is configured to:
determine a relay transmission time $t_{RM}$ of the relayed signal $S_R$ corresponding to each of the plurality of mobile stations, and
determine a best fit relay transmission time $t_{RM-BEST}$ based on individual relay transmission times $t_{RM}$ corresponding to the plurality of mobile stations,
wherein the mobile station communication unit is configured to transmit, at the best fit relay transmission time $t_{RM-BEST}$, the relayed signal $S_R$ to the plurality of mobile stations,
wherein the best fit relay transmission time $t_{RM-BEST}$ is determined so that a number of mobile stations receiving the relayed signal $S_R$ and the communication signal $S_C$ within a predetermined time period of each other is optimized,
wherein the communication control unit is configured to determine the relay transmission time $t_{RM}$ corresponding to each of the plurality of mobile stations by performing for each mobile station:
determining quantities $r_{BR}$, $D_{BR}$, $r_{MR}$; and
calculating the relay transmission time $t_{RM}$ based on the quantities $r_{BR}$, $D_{BR}$ and $r_{MR}$,
wherein the quantity $r_{BR}$ represents a reception time of the communication signal $S_C$ from the base station at the relay station,
wherein the quantity $D_{BR}$ represents a signal propagation delay between the base station and the relay station, and
wherein the quantity $r_{MR}$ represents a reception time of a communication signal $S_M$ from the mobile station at the relay station.

26. The wireless network of claim 25, wherein the best fit relay transmission time $t_{RM-BEST}$ is a midpoint of a time window that overlaps a range of relay transmission times $t_{RM}$ of the plurality of mobile stations such that a number of the relay transmission times $t_{RM}$ falling within the time window is maximized, wherein a duration of the time window is the predetermined time period.

27. The wireless network of claim 25, wherein the best fit relay transmission time $t_{RM-BEST}$ is a mean, a median or a mode of the relay transmission times $t_{RM}$ of the plurality of mobile stations.

28. The wireless network of claim 25,
wherein the communication control unit is configured to determine the relay transmission time $t_{RM}$ of the relayed signal $S_R$ corresponding to each of the plurality of mobile stations based on equation $t_{RM} \approx 2(r_{BR}-D_{BR}-K_2)+K_1+K_3-r_{MR}$, and
wherein $K_1$, $K_2$ and $K_3$ are constants related to differences in timing of transmission from the relay station, the base station, and the mobile station, respectively as imposed by a frame structure of the wireless network.

29. The relay station of claim 25, wherein the communication control unit is configured to determine the individual relay transmission times $t_{RM}$ without any of the mobile stations performing a ranging process.

30. The relay station of claim 25, wherein the relayed signal $S_R$ is not a converted form of the communication signal $S_C$.

* * * * *

UNITED STATES PATENT AND TRADEMARK OFFICE
CERTIFICATE OF CORRECTION

PATENT NO.      : 8,391,201 B2
APPLICATION NO. : 11/957522
DATED           : March 5, 2013
INVENTOR(S)     : Khayrallah et al.

It is certified that error appears in the above-identified patent and that said Letters Patent is hereby corrected as shown below:

In the Specification

In Column 4, Line 14, delete "$t_{RM\text{-}BEST}$," and insert -- $t_{RM\text{-}BEST}$. --, therefor.

In the Claims

In Column 11, Line 27, in Claim 1, delete "$D_{BR}$, $r_{MR}$, and $r_{MR}$," and insert -- $D_{BR}$, and $r_{MR}$, --, therefor.

In Column 12, Line 59, in Claim 10, delete "$D_{BR}$ and $r_{MR}$," and insert -- $D_{BR}$, and $r_{MR}$, --, therefor.

In Column 13, Line 53, in Claim 16, delete "$D_{BR}$ and $r_{MR}$," and insert -- $D_{BR}$, and $r_{MR}$, --, therefor.

In Column 15, Line 23, in Claim 25, delete "$D_{BR}$ and $r_{MR}$," and insert -- $D_{BR}$, and $r_{MR}$, --, therefor.

Signed and Sealed this
Eleventh Day of June, 2013

Teresa Stanek Rea
*Acting Director of the United States Patent and Trademark Office*